(12) United States Patent
Wouters

(10) Patent No.: US 9,164,233 B2
(45) Date of Patent: Oct. 20, 2015

(54) FIELD INSTALLABLE CABLE SPLICE SYSTEM

(71) Applicant: Optical Cable Corporation, Roanoke, VA (US)

(72) Inventor: Vincent A. Wouters, McKinney, TX (US)

(73) Assignee: Optical Cable Corporation, Roanoke, VA (US)

( * ) Notice: Subject to any disclaimer, the term of this patent is extended or adjusted under 35 U.S.C. 154(b) by 182 days.

(21) Appl. No.: 13/929,631

(22) Filed: Jun. 27, 2013

(65) Prior Publication Data

US 2014/0010502 A1    Jan. 9, 2014

Related U.S. Application Data

(60) Provisional application No. 61/664,924, filed on Jun. 27, 2012.

(51) Int. Cl.
    *G02B 6/255*    (2006.01)
    *G02B 6/38*     (2006.01)
(52) U.S. Cl.
    CPC .............. *G02B 6/255* (2013.01); *G02B 6/3801* (2013.01); *Y10T 29/49947* (2015.01)
(58) Field of Classification Search
    USPC .......................................................... 385/99
    See application file for complete search history.

(56) References Cited

U.S. PATENT DOCUMENTS

| | | | | |
|---|---|---|---|---|
| 4,427,262 A * | 1/1984 | Oldham | | 385/71 |
| 5,367,594 A | 11/1994 | Essert et al. | | |
| 6,389,214 B1 * | 5/2002 | Smith et al. | | 385/136 |
| 6,421,495 B1 | 7/2002 | Hoffmeister et al. | | |
| 7,607,840 B2 * | 10/2009 | Martin | | 385/95 |
| 7,758,257 B2 | 7/2010 | Anderson et al. | | |
| 7,955,004 B2 * | 6/2011 | DiMarco | | 385/99 |
| 8,696,221 B2 * | 4/2014 | Vastmans et al. | | 385/99 |
| 2012/0020630 A1 * | 1/2012 | Vastmans et al. | | 385/99 |

FOREIGN PATENT DOCUMENTS

GB    2110834 A    6/1983

* cited by examiner

*Primary Examiner* — Sung Pak
(74) *Attorney, Agent, or Firm* — The Van Winkle Law Firm; David M. Carter; William G. Heedy

(57) ABSTRACT

A combination of an inner crimp tube and a crimp sleeve provide a basis for securing a connection between respective first and second cables through which optical fibers extend and can be spliced together for signal transmission. The combination of the inner crimp tube and the crimp sleeve includes the inner crimp tube receiving at least one strength member from each respective cable, wherein the inner crimp tube is positioned along lengths of the strength members such that the strength members extend through the inner crimp tube. Loose ends of respective strength members fold back over opposite ends of the inner crimp tube to join strength members of each cable to a common structure. At least one crimp sleeve secures the respective loose ends of the strength members to the inner crimp tube.

15 Claims, 6 Drawing Sheets

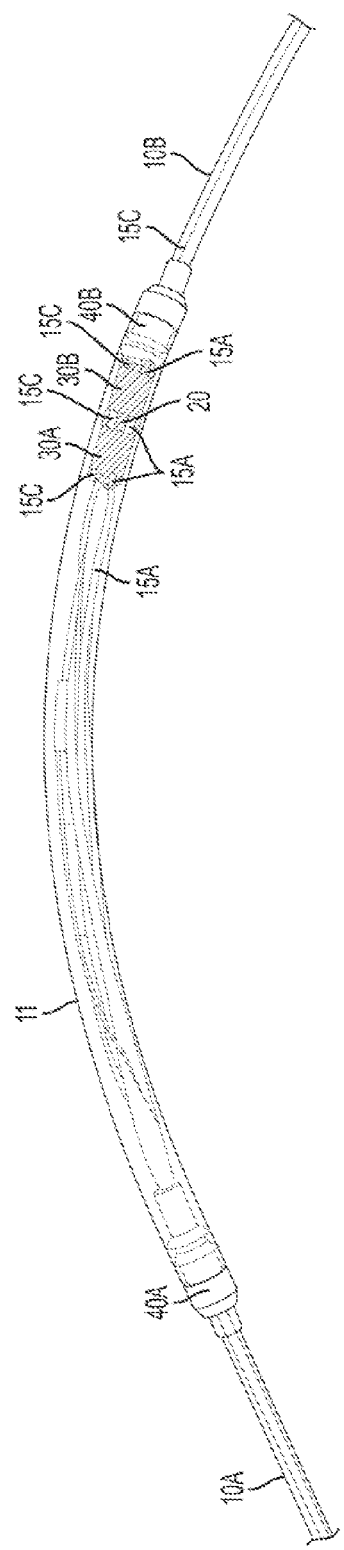

FIELD INSTALLABLE CABLE SPLICE SYSTEM

CROSS-REFERENCE TO RELATED APPLICATIONS

This application claims priority to and incorporates entirely by reference U.S. Provisional Patent Application Ser. No. 61/664,924 filed on Jun. 27, 2012.

FIELD OF THE INVENTION

The invention relates to the field of connectors for cables, particularly fiber optic cables, utilizing strength members that engage a connector to provide a secure system for splicing optical fibers together in a transmission system.

BACKGROUND

The art of electronic and fiber optic communications is replete with different kinds of connectors for numerous environments and specialized applications. Connector systems are already designed to resist extreme harsh mechanical and environmental conditions, including high vibration, mechanical and thermal shock, and fluid immersion. Also, these cables must continue to operate under extreme tension loading. It continues to be imperative, however, for new connector designs to maintain the integrity of the electrical cables and optical fibers being connected and to minimize damage in every way possible.

With so many different kinds of connectors available to system installation professionals, it is difficult to ensure that a proper cable intersects an appropriate mate with a convenient connector that also protects the underlying fibers. A problem exists in the field of electrical and fiber optic connectors in that the connectors remain limited in versatility and are not designed with sufficient weatherproof and hazard-proof bodies to protect the conductors therein.

The art of electrical and fiber optic cables also relies particularly on connector accessories that provide proper tensile strength and sturdiness for pulling optical fibers within cables. This is especially true when optical fibers are matched for splicing within a ferrule or other splicing mechanism. Cables that house optical fibers subject to splicing with orating optical fibers from adjoining cables are particularly vulnerable to flawed connection in harsh environments.

One of the problems associated with fiber optic splicing systems is providing a reliable connection point between the cables themselves. By connecting the cables in a sturdy and reliable way, the fiber optic splice is less vulnerable to separation due to outside forces. The cable connection absorbs the brunt of twists, turns, tensile forces, and other stresses so that the fiber optic splice remains intact. Thus, there is a need for an improved mechanism for connecting cables that shield underlying optical fibers, particularly when the optical fibers from the cables will be spliced together with mating optical fibers from adjoining cables. The connection point for the overall cables should provide a mechanism to ensure that the cable splice maintains its integrity regardless of outside forces in any direction on the cables themselves.

BRIEF SUMMARY OF THE INVENTION

In one embodiment, a combination of an inner crimp tube and a crimp sleeve provide a basis for securing a connection between respective first and second cables through which optical fibers extend to splice together for signal transmission. The combination of the inner crimp tube and the crimp sleeve includes the inner crimp tube receiving at least one strength member from each respective cable, wherein the inner crimp tube is positioned along lengths of the strength members such that the strength members extend through the inner crimp tube. Loose ends of respective strength members fold back over opposite ends of the inner crimp tube to join strength members of each cable to a common structure. At least one crimp sleeve secures the respective loose ends of the strength members to the inner crimp tube.

In another embodiment, a system secures a pair of cables by connecting strength members running through each cable. The system includes an inner crimp tube receiving at least one strength member from each cable, and the strength members extend through the inner crimp tube such that loose ends of respective strength members fold back over opposite ends of the inner crimp tube. At least one crimp sleeve secures respective loose ends of the strength members to the inner crimp tube.

In a third embodiment, a method includes securing respective first and second cables by connecting strength members from each cable to a common structure. The method includes extending a loose end of a respective strength member from each cable through an inner crimp tube such that respective strength members enter and exit the inner crimp tube from respective opposite ends. Upon exiting the opposite ends of the inner crimp tube, the loose ends are folded over the respective opposite ends of the inner crimp tube. At least one crimp sleeve is positioned over both the inner crimp tube and the respective loose ends of the strength members.

BRIEF DESCRIPTION OF THE FIGURES

FIG. 1B is a side plan view of the interior of the field installable cable splice system of FIG. 1A.

DETAILED DESCRIPTION

Terms used herein are intended to have their broadest plain meanings. For example, the terms "cable" and "conductor" are not limited to any single application, thereby including electrical and fiber optic cables or conductors as well as hybrids thereof.

From the foregoing description of embodiments of the invention, it will be apparent that many modifications may be made therein. It will be understood that these embodiments of the invention are exemplifications of the invention only and that the invention is not limited thereto. The invention is described in terms of connecting cables in the context of a fiber optic splicing system, but the concepts disclosed and claimed below are equally applicable to any application requiring a connector between cables having elongated strength members sufficient to connect to a common structure to hold the cables in alignment. The figures associated with this disclosure are for example only and are not limiting of the various positions or attachment points for components of the field installable cable splicing system disclosed herein.

In one embodiment disclosed in the attached Figures, at least two respective cables are positioned to allow a user to adjoin conductors extending from the respective cables while maintaining a proper alignment so that the conductors can be connected for continuous signal transmission through the system. This embodiment incorporates a common connection structure that allows the conductors from each cable to connect as desired while the cables are held in place with the common connection structure, such as the inner crimp tube described below. Overall, the field installable cable splice system provides a stable connection between cables, and that connection is removed from the splice connection between conductors emanating from the cables. Even though the splice connection is separate from the cable connection, the cables are suitable to absorb or deflect outside shear or tensile forces that could damage or disrupt the splice within the system.

Figure 1A:
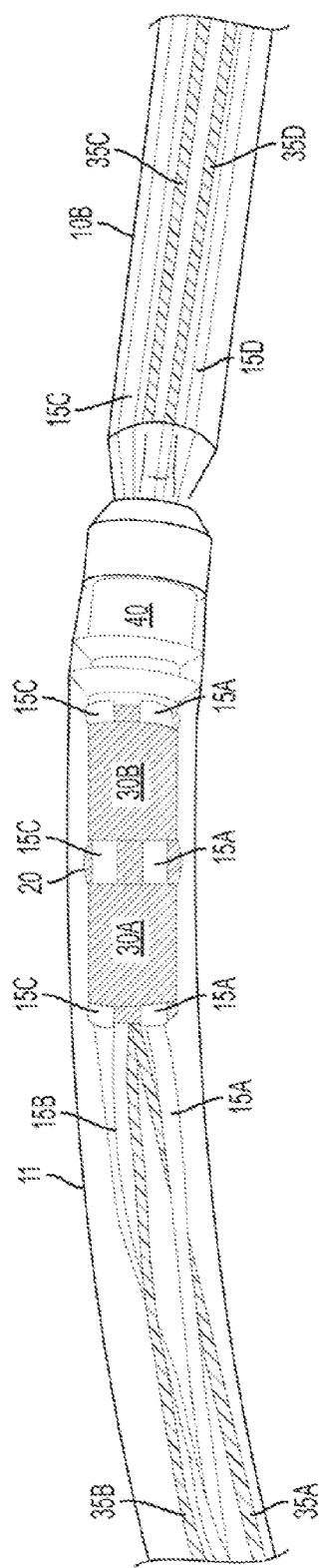
FIG. 1A is a side plan view of a cable connection mechanism having an inner crimp tube receiving strength members from respective cables within a field installable cable splice system.
Figure 1C:
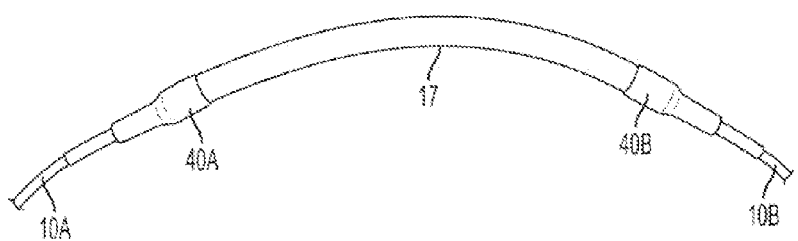
FIG. 1C is a side perspective view of the field installable cable splice system of FIG. 2 incorporated into a flexible outer hose.

One embodiment of the system is shown in FIGS. 1A-1C, which illustrate that the common connector for transmission cables, such as, but not limited to, fiber optic cables (10A, 10B) may include a combination of mechanical devices that interact to hold the cables (10A, 10B) in a fixed alignment. The combination of connecting structures is particularly useful for cables that incorporate strength members, such as linear, flexible lines of a polymeric composition that can extend beyond a cable wall or hose through an open end of the cable. This combination may include an inner crimp tube (20) and a crimp sleeve (30A, 30B) that secure a connection between respective first and second cables (10A, 10B) through which optical fibers (35A, 35B, 35C, 35D) extend and are conveniently spliced together for signal transmission. FIG. 1B illustrates that the inner crimp tube (20) receives at least one strength member (15) from each respective cable (10A, 10B), wherein the inner crimp tube (20) is positioned along lengths of the strength members (15A, 16B, 15C, 15D in FIG. 1A), such that the strength members (15A, 156, 15C, 15D) extend through the inner crimp tube 20). Loose ends (16A, 16B, 16C, 16D) of each respective strength member (15) fold back over opposite ends (19A, 19B) of the inner crimp tube (20). In this way, each cable (10A, 10B) contributes at least one of its strength members (15) to a common connection structure (e.g., the inner crimp tube (20) and crimp sleeve (30)) that secures the cables together but removes the more intricate conductor splice connection (FIG. 1B, Ref. 21) from the cable connection point held in place by the common connection structure (20, 30). In other words, in the context of fiber optic cables, the splice connection points (FIG. 1B, Ref. No. 21) for the optical fibers (35) are separate from the common connection structure (e.g., the inner crimp tube (20) and crimp sleeve (30)) that secures portions of the fiber optic cables (10A, 10B) to each other. The position of the common connection structure (20, 30) connecting the cables (10A, 10B) can be at any point along the length of the strength members (15A-15D), and the position shown in the drawings is for example only.

As shown in FIG. 1A and FIG. 1B, after the loose ends (16A, 16B, 16C, 16D) of each strength member are folded back over opposite ends (19A, 19B) of the inner crimp tube (20), at least one crimp sleeve (30) secures the respective loose ends (16) of the strength members (15) to the inner crimp tube (20). In the embodiment shown in the Figures of this disclosure, a separate crimp sleeve (30A, 30B) secures respective loose ends (16A, 16C) of respective strength members (15A, 15C) to the inner crimp tube (20). Although not shown in the drawings, the crimp sleeves (30A, 30B) shown in FIGS. 1A and 1B also secure loose ends (16B, 16D) for strength members (15B, 15D) that may also extend from respective cables (10A, 10B) shown in FIG. 1A.

In the embodiment shown in FIGS. 1A-1C, the strength members (15) are used to hold the cables (10A, 10B) in alignment and allow the cables to adjust positions as necessary to accommodate for outside forces or for packaging on a reel or other device, all the while protecting the fiber optic splices (21). In other words, the inner crimp tube (20) may receive at least one optical fiber (35) there through, but the inner crimp tube (20) is not a factor in splicing the optical fibers as ferrule would do. Instead, the combination of the inner crimp tube (20) and the crimp sleeves (30A, 30B) receiving and securing strength members (15) from cables provides a mechanism for ensuring a proper fiber optic cable connection for cables that must be spaced apart during the splicing operation and construction.

The embodiment shown in FIGS. 1A-1C makes use of strength members (15) that are commonly used in fiber optic cable connections. The strength members (15) are useful for connecting the cables because the strength members are often made of an aramid yarn, such as Kevlar®, and are durable as well as flexible. In fact, one feature of the cable connection structure described herein is that it provides a mechanism for connecting the cables in a way that is entirely separate from the fiber splice (21), thereby accommodating a splicing operation that does not require reassembling the cable hose (17) in any particular way once the splicing work is complete. The cables (10A, 10B) may utilized and connected in the field, and then the optical fibers (35) can be spliced before wrapping the entire system in a sheath (11) as shown in in FIG. 1A.

The above noted combination of inner crimp tube (20) and crimp sleeve (30A, 30B) accommodates a system of connecting cables (10A, 10B) via their respective strength members (15) and creating a fiber splice (21) separate from the cable connection. When described as a system, the system secures a pair of cables (10A, 10B) by connecting strength members (15A, 15B, 15C, 15D) running through each cable. The system further includes an inner crimp tube (20) receiving at least one strength member (15) from each cable (10). The strength members extend through the inner crimp tube (20), and loose ends (16) of respective strength members fold back over opposite ends (19) of the inner crimp tube. At least one crimp sleeve (30A, 30B) secures the respective loose ends of the strength members to the inner crimp tube.

Similar to the description above, the system incorporates an inner crimp tube (20) having a first end (19A) and a second end (19B). At least one strength member (15A) from a first cable (10A) extends through the first end (19A) of the inner crimp tube and folds back over the second end (19B) of the inner crimp tube. A strength member (15C) from a second cable (10B) extends through the second end (19B) of the inner crimp tube (20) and folds back over a first end (19A) of the inner crimp tube (20). In one embodiment, a first crimp sleeve (30A) and a second crimp sleeve (30B) hold loose ends (16) of respective strength members (15). The first crimp sleeve (30A) secures one of the respective strength members (15) to the inner crimp tube (20) and the second crimp sleeve (30B) secures the other of the respective strength members to the inner crimp tube. Once the cable connection is complete, flexible sheath (11) or hose (17) may be connected to the first and second cables to extend over an optical fiber splice (21), the inner crimp tube (20), and the crimp sleeve (30). The overall system remains entirely secure and flexible. As shown in FIG. 5, the system is amenable to winding about a reel for transport.

Figure 2:
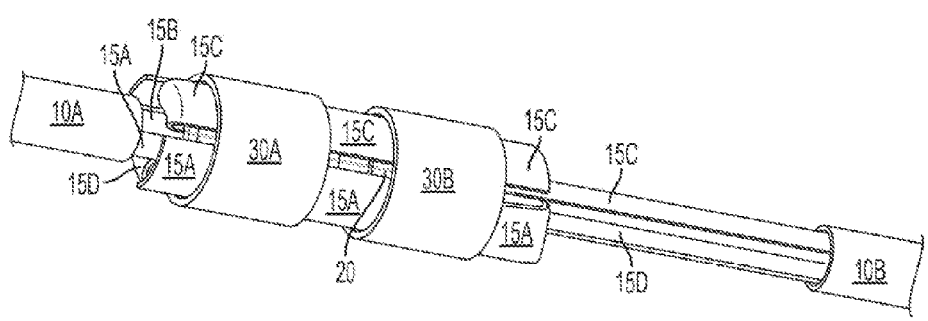
FIG. 2 is side plan view of the cable connection mechanism of FIG. 1A enlarged to illustrate an incoming pair of strength members from a fiber optic cable.
Figure 3A:
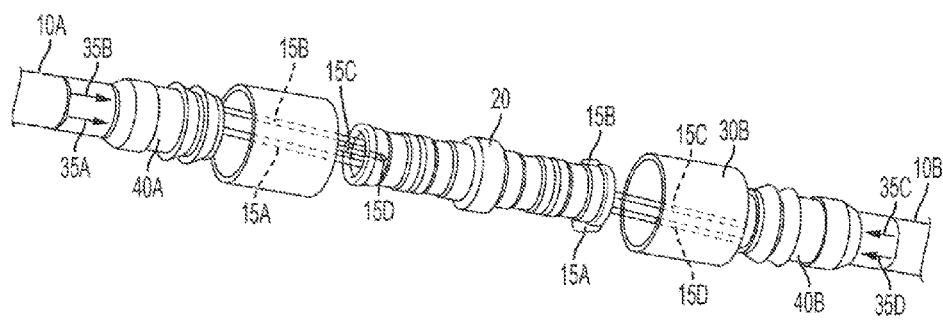
FIG. 3A is an exploded view of the field installable cable splice system of FIG. 1A.

FIG. 2 illustrates a closer view of the cable connection structure disclosed herein. Strength members (15A-15D) emanate from a pair of cables (10A, 10B) and are used to connect the cables in preparation for cable splicing. The strength members enter opposite ends (19A, 19B) of the inner crimp tube (20), extend all the way through the inner crimp tube (20), and exit a far end (19B, 19A) of the inner crimp tube. In other words, each strength member (15) exits an end of the inner crimp tube that is opposite the end at which a respective strength member entered the inner crimp tube. The strength member folds back over this far end before being secured to the inner crimp tube by crimp sleeves. FIG. 3A shows an exploded view of the overall cable connection described herein.

Figure 3B:
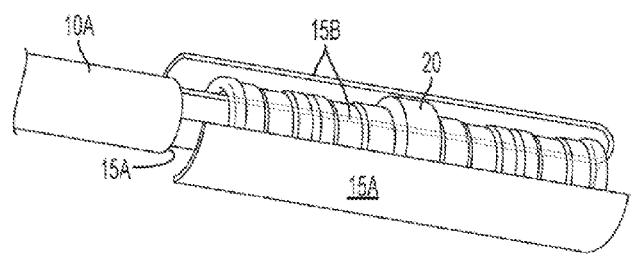
FIG. 3B is a side perspective view of the inner crimp tube from FIG. 1A receiving strength members from an incoming fiber optic cable.
Figure 3C:
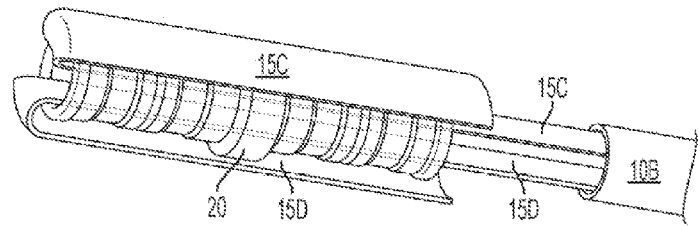
FIG. 3C is side perspective view of the inner crimp tube from FIG. 1A receiving strength members from a second incoming fiber optic cable other than the fiber optic cable of FIG. 3B.
Figure 3D:
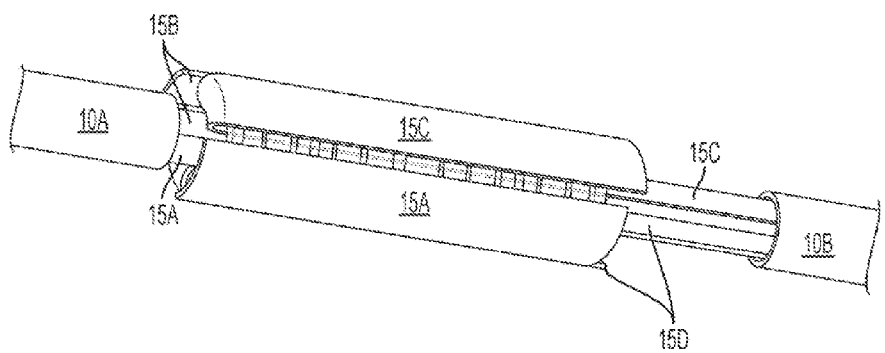
FIG. 3D is a side perspective view of the field installable cable splice system of FIG. 1 with the strength members from respective cables folded over the inner crimp tube.
Figure 4:
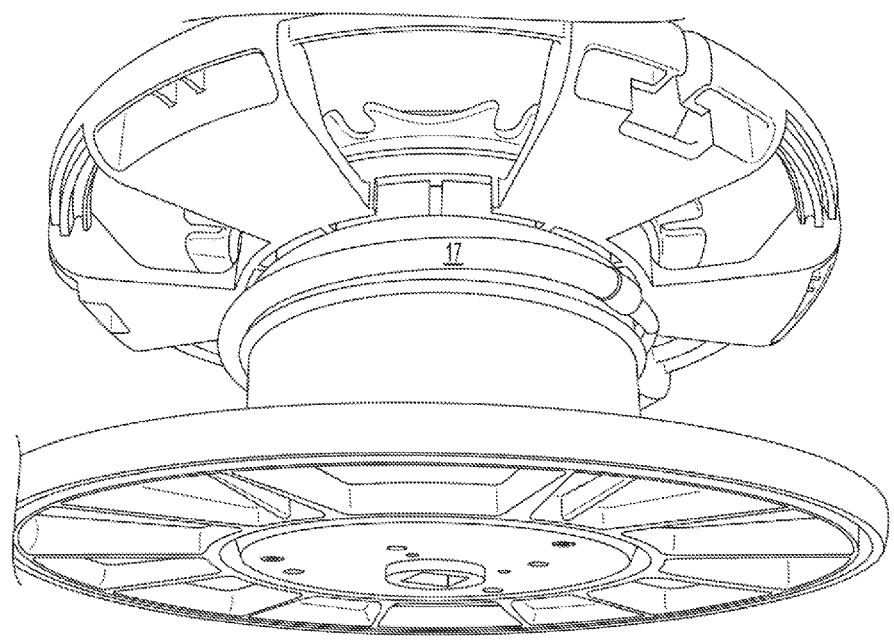
FIG. 4 is a reel of fiber optic cable incorporating the flexible field installable cable splice system of FIG. 1.

FIGS. 3B-3D illustrate steps in a method of assembling the cable connection that conveniently allows for field installation of a cable splice system. The system can be configured in steps right at the point of use, therefore. A method of securing respective first and second cables (10A, 10B) incorporates connecting strength members (15A, 15B, 15C, 15D) from each cable to a common structure, typically an inner crimp tube (20). The method includes extending a loose end (16) of respective strength members (15A, 15C) from each cable through an inner crimp tube (20) such that respective strength members enter and exit the inner crimp tube (20) from respective opposite ends (19). As shown in FIGS. 3B and 3C, the method includes the step of folding a respective loose ends (16) of respective strength members (15) over respective opposite ends (19) of the inner crimp tube (20). As set forth in FIG. 3D, the strength members from respective cables (10A, 10B) are arranged at ninety degrees of separation about the inner crimp tube (20). Strength members from a single cable are more easily connected to the inner crimp tube (20) at points along the inner crimp tube that are separated by 180 degrees as measured from the diameter of the inner crimp tube. A crimp sleeve is secured aver both the inner crimp tube and the respective loose ends of the strength members.

Because the cable connection occurs via the strength members (15), the step of splicing optical fibers (35) extending from the respective cables is accomplished without disturbing or involving the point at which the strength members are connected. In fact, in one embodiment, only optical fibers from one cable passes entirely through the inner crimp tube (20). The user may choose to apply a sheath (11) or a hose (17) over the crimp sleeve (30), the inner crimp tube (20), and at least a portion of the exposed strength members.

Optional configurations for the cable connection include the step of positioning the inner crimp tube (20) over optical fibers and strength members extending from a hose barb (40) terminating one of the cables (10). In this embodiment, which does not limit the invention described herein, the inner crimp tube (20) is directly adjacent the hose barb (40) before applying a sheath (11) over the crimp sleeve (30) the inner crimp tube (20), and at least a portion of the strength members (15).

Of course, the method includes the optional step of using more than one crimp sleeve (30A, 30B) as necessary.

The invention is further set forth in the following claims.

The invention claimed is:

1. A combination of an inner crimp tube and a crimp sleeve, the combination securing a connection between respective first and second cables through which optical fibers extend to splice together for signal transmission, the combination comprising:
    an inner crimp tube receiving at least one strength member from each respective cable, wherein said inner crimp tube is positioned along lengths of the strength members such that said strength members extend through said inner crimp tube, wherein loose ends of respective strength members fold back over opposite ends of said inner crimp tube;
    at least one crimp sleeve securing said respective loose ends of said strength members to said inner crimp tube;
    a flexible sheath connected to the first and second cables and extending over an optical fiber ice, said inner crimp tube, and said crimp sleeve; and
    wherein the optical fiber splice may be selectively made inwards or outwards of said inner crimp tube, 2. A combination according to claim 1, further comprising optical fibers extending from one of said cables through said inner crimp tube alongside the strength members.

3. A combination according to claim 2 wherein said inner crimp tube comprises a first end and a second end, and wherein at least one strength member from a first cable extends through said first end of said inner crimp tube and folds back over said second end of said inner crimp tube and a strength member from a second cable extends through said second end of said inner crimp tube and folds back over said first end of said inner crimp tube.

4. A combination according to claim 1, wherein said at east one crimp sleeve comprises a first crimp sleeve and a second crimp sleeve, wherein said first crimp sleeve secures one of the respective strength members to said inner crimp tube and said second crimp sleeve secures the other of the respective strength members to said inner crimp tube.

5. A combination according to claim 1, wherein said inner crimp tube is positioned along said respective strength members between one of the cables and an optical fiber splice.

6. A combination according to claim wherein said strength members comprise an aramid yarn.

7. A combination according to claim 6, wherein said aramid yarn is sufficiently flexible for bending over an end of said inner crimp tube.

8. A system for securing a pair of cables by connecting strength members running through each cable, the system comprising:
    an inner crimp tube receiving at least one strength member from each cable, said strength members extending through said inner crimp tube, wherein loose ends of respective strength members fold back over opposite ends of said inner crimp tube;
    at least one crimp sleeve securing said respective loose ends of said strength members to said inner crimp tube;
    a flexible sheath connected to the first and second cables and extending over an optical fiber splice said inner crimp tube, and said crimp sleeve; and
    wherein the optical fiber splice may be selectively made inwards or outwards of said inner crimp tube.

9. A system according to claim 8, wherein said inner crimp tube comprises a first end and a second end, and wherein at least one strength member from a first cable extends through said first end of said inner crimp tube and folds back over said second end of said inner crimp tube, and wherein a strength member from a second cable extends through said second end of said inner crimp tube and folds back over said first end of said inner crimp tube.

10. A system according to claim 8, wherein said at least one crimp sleeve comprises a first crimp sleeve and a second crimp sleeve, wherein said first crimp sleeve secures one of the respective strength members to said inner crimp tube and said second crimp sleeve secures the other of the respective strength members to said inner crimp tube.

11. A system according to claim 8, wherein said inner crimp tube is positioned along said respective strength members between one of the cables and an optical fiber splice.

12. A system according to claim 8, wherein said strength members comprise an aramid yarn.

13. A method of securing respective first and second cables by connecting strength members from each cable to a common structure, the method comprising:

extending a loose end of a respective strength member from each cable through an inner crimp tube such that said respective strength members enter and exit said inner crimp tube from respective opposite ends;

folding a respective loose end of said respective strength members over said respective opposite ends of said inner crimp tube;

securing a crimp sleeve over both said inner crimp tube and said respective loose ends of said strength members;

splicing optical fibers extending from the respective cables, wherein at least one of said optical cables passes entirely through said inner crimp tube, wherein the optical fiber splice may be selectively made inwards or outwards of said inner crimp tube; and applying a sheath over said crimp sleeve, said inner crimp tube, and at least a portion of said strength members.

14. A method according to claim 13, further comprising the step of positioning said inner crimp tube over optical fibers and strength members extending from a hose barb terminating one of said cables.

15. A method according to claim 13, further comprising the step of securing said loose end of a first strength member with a first crimp sleeve and securing said base end of a second strength member with a second crimp sleeve.

\* \* \* \* \*